UNITED STATES PATENT OFFICE.

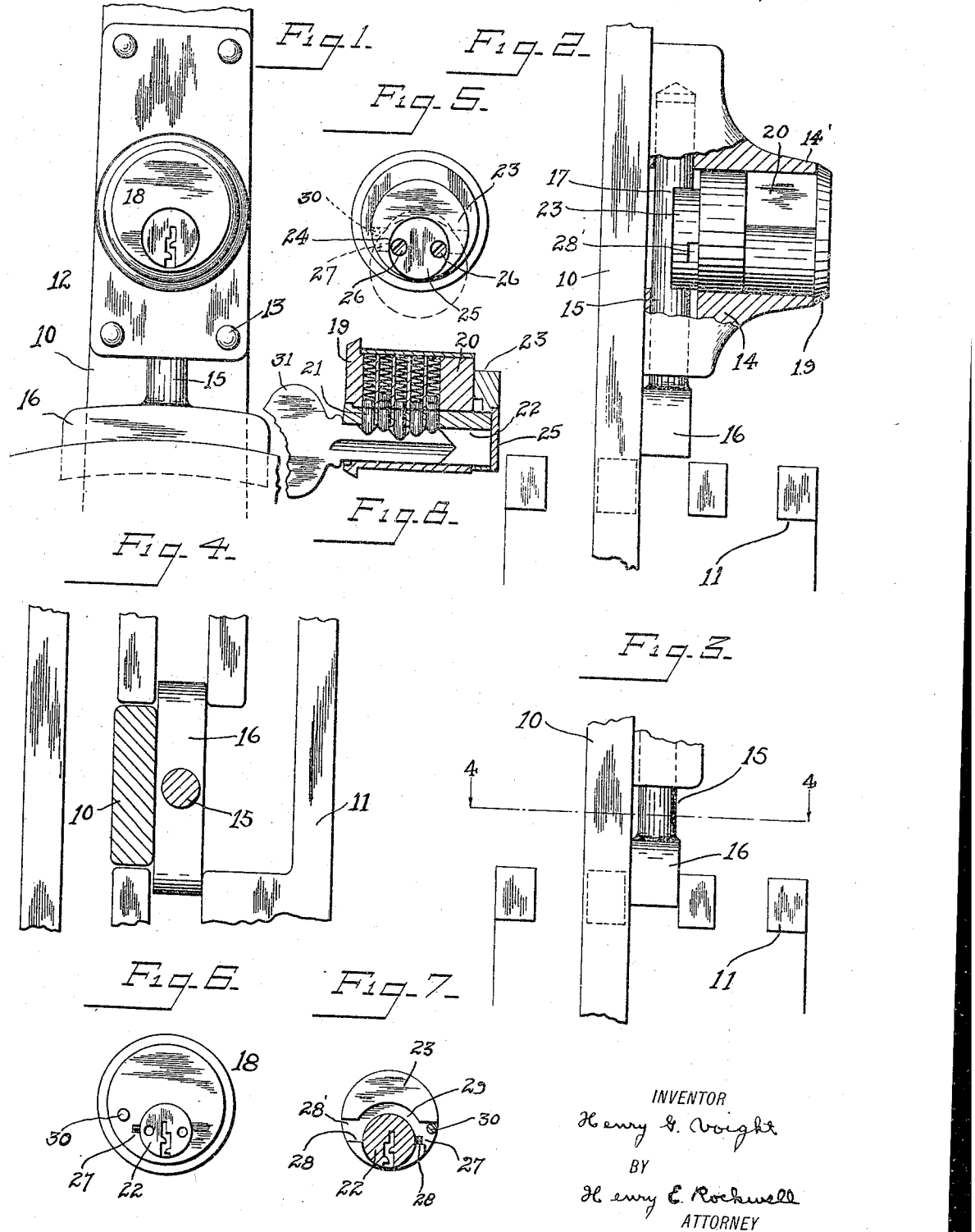

HENRY G. VOIGHT, OF NEW BRITAIN, CONNECTICUT, ASSIGNOR TO SARGENT & COMPANY, OF NEW HAVEN, CONNECTICUT, A CORPORATION OF CONNECTICUT.

LOCK.

1,293,258.  Specification of Letters Patent.  Patented Feb. 4, 1919.

Application filed December 24, 1917. Serial No. 208,620.

*To all whom it may concern:*

Be it known that I, HENRY G. VOIGHT, of New Britain, county of Hartford, State of Connecticut, have invented certain new and useful Improvements in Locks, of which the following is a full, clear, and exact description.

This invention relates to locks, and more particularly to a lock designed to lock a gear shift lever so that the lever cannot be moved by an unauthorized person after it has been locked in its neutral position.

The object of this invention is to provide a locking device consisting of the sliding bolt and a key-controlled lock for operating this bolt.

A further object of this invention is to provide a locking device having a sliding bolt, which bolt is adapted to coöperate with the guiding bracket for the gear shift lever of an automobile, whereby the lever may be locked against movement.

To these and other ends, the invention consists in the novel features and combinations of parts to be hereinafter described and claimed:

In the accompanying drawing:

Figure 1 is a fragmentary front elevation of a gear shift lever and its guiding bracket, showing my novel locking means applied to the lever, the lower end of the locking bolt being shown in locking engagement with the bracket.

Fig. 2 is a side elevation of the same, showing part of the case broken away to disclose the sliding bolt and lock mounted therein, the bolt being shown retracted;

Fig. 3 is a fragmentary view similar to Fig. 2, showing the bolt protracted;

Fig. 4 is a section on line 4—4 of Fig. 3, looking in the direction of the arrows;

Fig. 5 is a rear end view of the cylinder lock, one position of the eccentric disk upon the lock being indicated in dotted lines;

Fig. 6 is a view similar to Fig. 5, the eccentric disk being removed;

Fig. 7 is a sectional view taken between the rear end of the cylinder lock and the eccentric disk, looking in the direction of the disk; and Fig. 8 is a longitudinal sectional view through the cylinder lock.

In the drawing, 10 designates a gear shift lever adapted to shift the gears of an automobile. The slotted guiding bracket with which these levers are commonly provided is designated generally by the numeral 11. My improved locking device is designated generally by the numeral 12 and is shown mounted upon one face of the lever 10 by any desired securing means such as rivets 13. It will be apparent that my improved locking device may be applied to practically any type of gear shift lever which is provided with a slotted guiding bracket and that its use is not limited to the particular type of lever and bracket shown in the drawing. Furthermore, it will be apparent that my locking device is capable of other uses and that its scope of utility is not necessarily limited to the locking of a gear shift lever for an automobile.

My improved device 12 comprises a housing or case 14, having a flat face or base adapted to contact with one face of the lever or any other surface to which the device 12 is to be secured by means of the rivets 13, above mentioned. Inside the case 14 is mounted the sliding bolt 15, having an enlarged portion 16 formed upon its outer end, which portion is substantially rectangular in cross-section. The bolt 15 has a notch 17 formed in one face thereof, the object of which will be hereinafter described. It will be noted that one face of the extension 16 lies substantially in the plane of the base of the case 14, the construction being such that this face will form sliding contact with the surface upon which the case 14 is mounted and will thus prevent the bolt 15 from rotating about its axis. The locking device 12 is so positioned upon its lever that when the bolt is protracted the extension 16 will enter one pair of slots formed in the guiding bracket 11, as shown in Figs. 1 and 3, and when the bolt is retracted it will clear the bracket 11, as shown in Fig. 2. The outer end of the extension 16 is preferably curved to conform with the curvature of the bracket 11. It will be apparent that when the lever 10 is moved to its neutral position, as shown in Fig. 4, the bolt 15 may be protracted so that the outer end of the extension will enter a pair of slots, as shown. The lever will thus be securely locked against movement.

The key-controlled locking means, which I have illustrated, consists of a cylinder lock designated generally by the numeral 18. This cylinder lock is mounted in a round opening or socket formed in the case 14 and extending at right angles to the sliding bolt, the arrangement preferably being such that the axis of the sliding bolt and the axis of the cylinder lock will lie in the same plane. The escutcheon 19 formed upon the outer end of the cylinder lock rests upon the outer face of the case 14, as shown in Fig. 2, the casing preferably being formed with the boss-like projection 14', the curved faces of which blend into the sloping circular edge of the escutcheon. The cylinder lock 18 may be secured within its openings or socket formed in the case 14 by any desired means (not shown).

The cylinder lock 18 is provided with the usual pin tumbler extension 20 having the pin tumblers 21, which coöperate with the key-plug or barrel 22. The key barrel preferably extends a short distance beyond the rear face of the cylinder lock, in order to receive an eccentric disk 23 which is provided with an eccentric opening 24 into which the projecting end of the barrel 22 extends. The outer face of the disk 23 is provided with a circular groove somewhat larger than the circular opening 24 and concentric therewith. This circular groove forms a seat in which the small disk 25 is mounted, the small disk being secured to the projecting end of the barrel 22 by any desired securing means such as screws 26, the arrangement being such that the eccentric disk 23 is loosely mounted on the projecting end of the barrel 22 and is held in place upon the projecting end by the small disk 23.

In order to provide operating means between the barrel 22 and the eccentric disk 23, the projecting end of the barrel is provided with a pin 27 extending at right angles thereto. This pin coöperates with shoulders 28 formed upon the disk 23, the disk being provided with a curved clearance space 29 which enables the pin to be moved out of contact with one shoulder 28 and into contact with the other shoulder without moving the disk 23. A convenient way of producing the shoulders 28 is to form a slot 28' extending across the underneath face of the disk. The angle through which the disk 23 may be swung is limited by a pin 30 which projects from the inner face of the cylinder lock, and with which the edge of the disk or a face formed by the slot 28' in the disk contacts.

From the above description it will be seen that what is known as a lazy action is provided between the barrel 22 and the disk 23. This construction permits the barrel to be rotated through a complete circle while the disk is rotated through only approximately half of that angle. The object in so constructing these parts is to enable the key 31 to be withdrawn from the lock when the disk 23 is in either the position shown in full lines in Fig. 5 or in the position indicated in dotted lines in this figure; that is, to enable the key 31 to be withdrawn from the lock when the bolt 15, which is operated by the disk 23, is in either its protracted or retracted position. The slot 17, above mentioned, is formed to snugly house a portion of the disk 23, so that when the disk is rotated about its eccentric mounting upon the projecting end of the barrel 22, the bolt will be operated.

The operation of my device, it is thought, will be clearly understood from the above description, it being seen that when the disk 23 is swung about its pivotal mounting formed by the projecting end of the barrel 22, it will necessarily move the bolt 15 in one direction or the other according to the direction in which the barrel 22 is rotated by its key 31. When the gear shift lever 10 has been moved to the position shown in Fig. 4, the bolt 15 may be readily shot forward so that it will move into locking engagement with the slots formed in the bracket 11, and the lever will thus be locked so that it can not be moved to shift the gears until the bolt is moved out of engagement with the bracket by means of the key 31.

While I have described my locking device as applied to a gear shift lever, it will be apparent that my device may be used for numerous other purposes than the one herein described.

I have not attempted to describe the modifications of the construction which may be adopted without departing from the scope of the invention.

What I claim is:

1. In combination with a sliding bolt having a notch formed in one face thereof, means for operating said bolt, comprising a cylinder lock, a key barrel mounted therein with its inner end positioned to extend into said notch, a disk rotatably and eccentrically mounted on the inner end of said key barrel within said notch, and a lazy connection between said key barrel and disk for operating said bolt.

2. A lock case having mounted therein a sliding bolt and a cylinder lock, said bolt having a notch formed therein, a key-barrel within said cylinder lock having its inner end extending into said notch, an eccentric disk for operating said bolt rotatably mounted upon the inner end of said key-barrel, and a lazy connection between said key-barrel and disk constructed and arranged to permit the key-barrel to be rotated through a complete circle in moving said bolt from its retracted to its protracted position, whereby the key-barrel may be returned to its normal locked position when the bolt is in either its retracted or protracted position.

3. In combination with a sliding bolt, a cylinder lock having a key-operated barrel, an eccentric disk rotatably mounted on said key-barrel, said disk having operative engagement with said sliding bolt, and a driving connection between said key-barrel and disk constructed and arranged to permit the key-barrel to be rotated through a complete circle while rotating its disk through only part of a circle, whereby said key-barrel may be rotated to its normal locked position when the sliding bolt is in either its retracted or protracted position.

4. A lock case having relatively large drill holes formed therein at substantially right angles to each other, a bolt slidably mounted in one of said holes, a cylinder lock mounted in the other of said holes, a key-barrel in said cylinder lock, said bolt having a notch formed in one face thereof, and a disk rotatably and eccentrically mounted upon said key-barrel operatively engaging said notch to operate said bolt when said key-barrel is rotated.

5. In combination with a sliding bolt, a cylinder lock having a key-barrel, an eccentric disk rotatably mounted on the inner end of said key-barrel, a driving connection between said disk and key-barrel, comprising spaced shoulders formed upon one of said elements, and a pin upon the other element positioned to be moved into operative engagement with either of said shoulders, said disk having operative engagement with said bolt.

6. In combination with a gear shift lever for an automobile having a slotted guiding bracket, a locking device for said lever, comprising a lock case having a socket therein secured to said lever, a bolt slidably mounted in said socket, a cylinder lock mounted in said lock case at substantially right angles to said bolt socket, a key-barrel within said cylinder lock, an eccentric disk mounted upon said key-barrel, a driving connection between said disk and key-barrel constructed to permit a limited rotation therebetween, and a driving connection between said disk and bolt, whereby operating said cylinder lock moves said bolt into and out of locking engagement with the guiding bracket.

In witness whereof I have hereunto set my hand on the 20th day of December, 1917.

HENRY G. VOIGHT.

Copies of this patent may be obtained for five cents each, by addressing the "Commissioner of Patents, Washington, D. C."